Dec. 10, 1968  C. SUCKER ET AL  3,415,109
INSTRUMENT FOR MEASURING AND RECORDING THE BOUNDARY
SURFACE PROPERTIES OF LIQUIDS
Original Filed Sept. 29, 1965  2 Sheets-Sheet 1

INVENTORS:
CHRISTIAN SUCKER, WALTER MESKAT, RUDOLF HEUSCH.
BY *Burgess, Dinklage & Sprung*
ATTORNEYS

United States Patent Office 3,415,109
Patented Dec. 10, 1968

3,415,109
INSTRUMENT FOR MEASURING AND RECORDING THE BOUNDARY SURFACE PROPERTIES OF LIQUIDS
Christian Sucker and Walter Meskat, Leverkusen, and Rudolf Heusch, Cologne-Stammheim, Germany, assignors to Farbenfabriken Bayer Aktiengesellschaft, Leverkusen, Germany, a corporation of Germany
Continuation of application Ser. No. 491,135, Sept. 29, 1965. This application Feb. 19, 1968, Ser. No. 706,705
Claims priority, application Germany, Oct. 10, 1964, F 44,195
2 Claims. (Cl. 73—64.4)

ABSTRACT OF THE DISCLOSURE

A device for measuring and recording the boundary surface properties of liquids, having a Wheatsone bridge measuring circuit operatively connected to a recording means; a horizontally disposed torsion wire connected at right angles to a pair of right-angularly disposed levers, one of which levers is attached to ring means adapted for insertion into a liquid to be measured, and the other of which levers terminates in a ferromagnetic plate disposed between a pair of induction coils within the Wheatstone bridge circuit.

---

Figure 1:
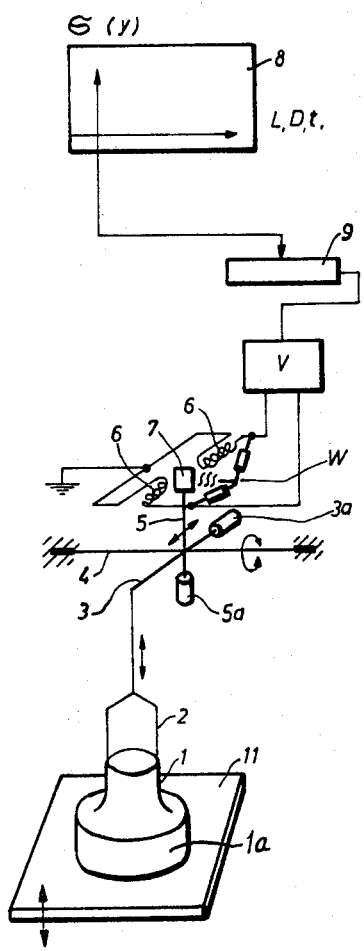

This is a continuation of application Serial No. 491,135 filed September 29, 1965, now abandoned.

The invention relates to an instrument for measuring and recording the boundary surface properties of liquids, which comprises a force-measuring system having a horizontally arranged torsion wire rigidly clamped at both ends, said torsion wire being connected to a measuring member which can be immersed in and removed from the liquid, and with which the strength is measured of the tensile force which is exerted in causing the measuring member to emerge from the liquid sheet adhering thereto.

Such known measuring instruments based purely on the surface-breaking principle have the disadvantage that it is not possible to carry out any arbitrary number of repetitions of measurement of the boundary surface tension $\sigma$ with the same liquid sample at any desired intervals of time without deleterious effect on the boundary surface conditions. It is just as impossible to undertake measurements of the boundary surface tension as a function of the time $t$ with constant elongation of the liquid sheet adhering to the measuring member from the time instant $t=0$ over time periods of any desired length, because in this way the liquid sheet is stressed until it breaks.

It has now been found that these disadvantages can be avoided according to the invention if the torsion wire has rigidly fixed thereon a lever system consisting of two levers disposed perpendicularly to one another, the lever connected to the measuring element carrying a taring weight and the other lever, likewise equipped with a taring weight, carrying a thin ferromagnetic plate which is disposed in the air gap between two coaxially arranged induction coils which form one branch of a Wheatstone bridge fed with high-frequency alternating voltage. The Wheatstone bridge is connected to a multistage carrier frequency measuring amplifier.

The tensile force is caused to be practically stationary by inductive de-tuning of the Wheatstone bridge in conjunction with the measuring amplifier, for the measurement travel of the unit of the boundary surface tension $\sigma$ is reduced (due to the sensitivity of the measuring amplifier connected to the inductive force emitter) to the hitherto unachieved value of $10^{-5}$ cm. It is now possible for the unit of the boundary surface tension $\sigma$ or fractions thereof to be made to coincide with the gradations of a recording paper of a recording instrument which is connected to the output of the carrier frequency measuring amplifier and which records the movement of the measuring element according to the movement of the liquid level.

In order to be able to repeat with any desired frequency the force measurement in the maximum of the tensile force without breaking the liquid sheet and thus without impairing the adjusted boundary surface condition, the recording instrument connected to the measuring amplifier is equipped according to the invention with a trailing diaphragm for a photocell relay and moved by recording stylus, the said relay being connected to a switching-off and change-over relay for driving the device causing the immersion and extraction of the measuring element.

Constructional examples of the arrangement according to the invention are shown diagrammatically in the drawing.

Figure 2:
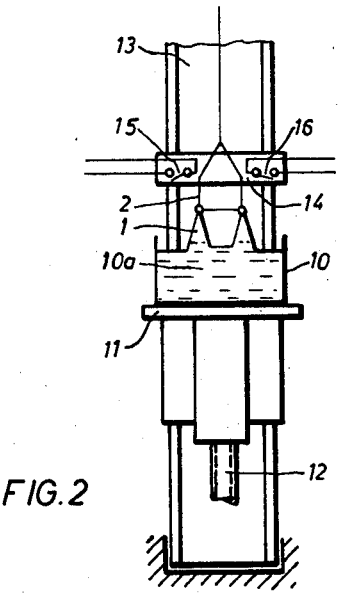
Figure 3:
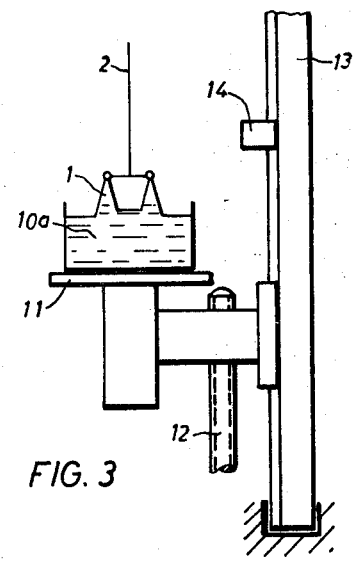
Figure 4:
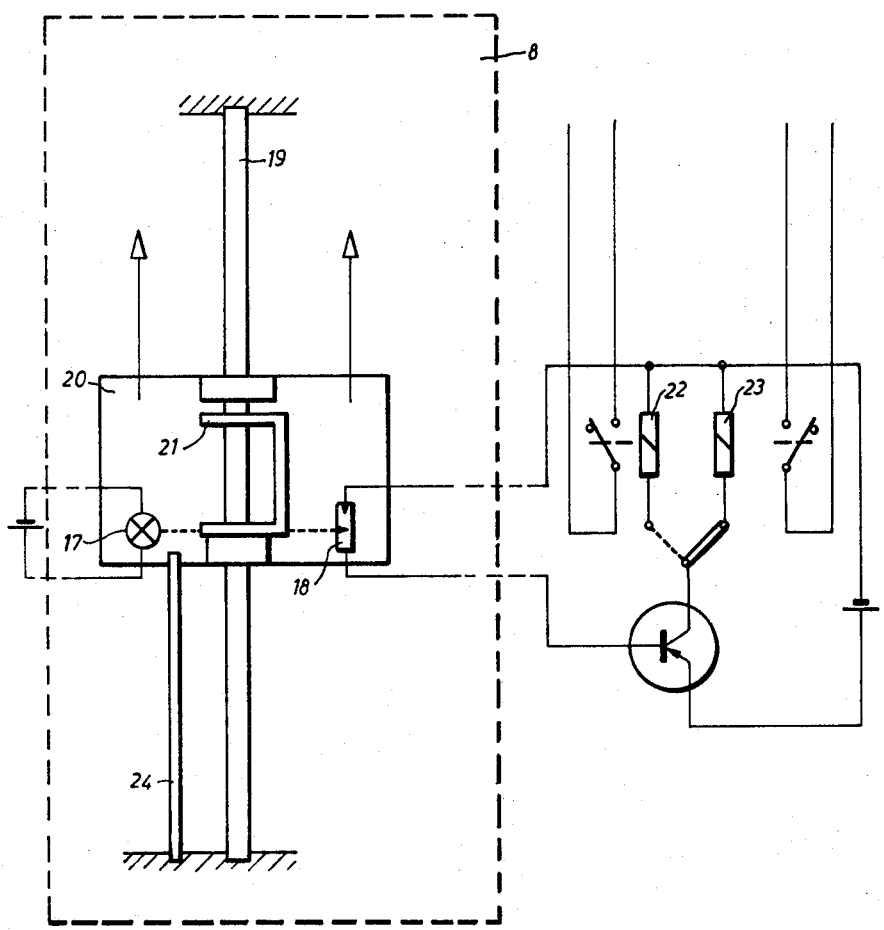

FIGURE 1 shows in diagrammatic form the construction of the instrument for measuring and recording the boundary surface properties of liquids. FIGURES 2 and 3 are respectively a front elevation and side elevation of a device causing the measuring element to be immersed in and to emerge from the liquid. FIGURE 4 shows an automatic change-over and switching-off device for driving the device according to FIGURES 2 and 3.

According to FIGURE 1, a vessel 1a is arranged on a table 11 which can be moved up and down, the said vessel containing a liquid, the boundary surface properties of which are to be measured and recorded. The reference 1 indicates a liquid sheet which remains adhering to a measuring element 2 consisting of a ring with a loop when the table is lowered, since a lever 3 is rigidly fixed on a horizontally arranged torsion wire 4 which is fixedly and rigidly clamped at both ends.

The tensile force exerted by the liquid sheet 1 on the measuring element 2 causes a twisting of the torsion wire 4 proportional to the force through the lever 3 which is connected at one end to the measuring element 2 and which carries at the other end a taring weight 3a. At the point where the lever 3 is fixed to the torsion wire 4, a second lever 5 is fixed at right-angles to the lever 3. The lever 5 is loaded with a weight 5a and carries at its upper end a thin ferromagnetic plate 7 located in the air gap which is formed between two coaxially arranged induction coils 6, these coils representing one branch of a Wheatstone bridge W fed with high frequency alternating current.

The directional force and the natural frequency of the measuring system can be so adjusted by the dimensions and choice of material of the torsion wire 4 that the measuring system is capable of vibrating after excitation in air and within the liquid to be tested, so that changes in the force or the boundary surface tension which occur very quickly as a function of time can be measured and recorded without delay; in this way, it is possible to use the measuring instrument as a boundary surface vibration viscometer for establishing the Trouton viscosity of the boundary surface or sheet.

The pair of induction coils 6 which, in conjunction with a carrier frequency measuring amplifier V having direct voltage output, serve for converting the force-proportional twisting of the torsion wire 4 into a force-proportional electric signal (bearing in mind that the thin plate 7 connected to the torsion wire 4 through the lever 5 is in the air gap of said coils and is moved according to the twisting of the torsion wire caused by the boundary surface tension of the liquid sheet 1) is arranged in differential circuit above the torsion wire. By the displacement of the thin plate 7, the Wheatstone bridge W, balanced according to quantity and phase, become unbalanced. The amplified modulation voltage which is freed from the carrier frequency and rectified is fed into the Y-channel of the single-channel direct voltage compensation recorder 8 which is used as recording instrument and which has a reversible synchronous motor for driving the paper (not shown), causing the deflection of the recording stylus (not shown). The adaptation of the unit of the boundary surface tension $\sigma$ to the graduation of the recording paper is obtained by modifying the amplification and by electrical multiplication with the aid of a voltage divider 9.

According to FIGURES 2 and 3, the immersion and extraction of the measuring element 2 in and from the liquid 10a to be tested, which is disposed in the container 10, is effected by lifting and lowering respectively the table 11. The lifting and lowering of the table 11 is effected by the spindle 12 being driven by a reversible synchronous motor (not shown), the vertical rail 13 serving as a guide. When using a table which can in addition carry out a rotational or an oscillatory movement, it is also possible with an additional torsional force measuring system to establish the viscosity or the vibration viscosity and relaxation phenomena in the boundary surface.

The electric motors (not shown) for driving the spindle 12 and for driving the paper feed (not shown) of the recorder 8 can be switched on, off and reversed simultaneously and also independently of one another, whereby it is possible at will to adjust the travel of the measurement vessel (as regards distance and direction and thus also the length and the elongation of the liquid sheet adhering to the measuring element) or, with constant length or elongation, the passage of time, to the length of the paper feed of the recorder 8.

A vertically adjustable slide 14 is fixed on the rail 13 above the table 11, and two pressure-operated switches 15 and 16 are arranged laterally adjacent one another on the slide, the said switches being actuated by the table on immersion of the measuring element 2, that is to say, when the table 11 is raised. With the closing of the switch 15, a time relay (not shown) is set in operation, which breaks the circuits for the drive of the paper feed of the recorder 8 (FIGURE 1) and of the spindle 12 for the actually set time period and thus causes the maintaining of the actually required intervals between the successive individual measurements, for example, in connection with the automatic repetition of the determining of the boundary surface tension on a single specimen.

After the stoppage period set by the time relay has elapsed, the table 11 is raised until the table also actuates the switch 16, the consequence of which is that the drive means for the paper feed of the recorder 8 and for the spindle 12 operate in the reverse direction, so that the table is lowered and the measuring element 2 again emerges from the measurement liquid.

The table 11 can be lowered at will to such an extent that the maximum force is reached, or until the liquid sheet 1 adhering to the measuring element 2 breaks away. If the maximum force is reached, the motor for driving the spindle 12 can be changed over by itself or simultaneously with the motor for driving the paper feed of the recorder 8.

The means for the automatic reversal or switching-off of the instrument at the maximum force is based on the fact that the differential quotients $$(\delta K/\delta L), (\delta K/\delta D) \text{ or } (\delta K/\delta t)$$

corresponding to $$(\delta \sigma/\delta L), (\delta \sigma/\delta D) \text{ or } (\delta \sigma/dt)$$

wherein $\delta K/\delta L$=change of force, in relation to the length of the liquid sheet 1, on the measuring ring 2 (for example FIG. 1)

$\delta K/\delta D$=change of force, in relation to the elongation (tension) of the sheet 1, on the measuring ring 2

$\delta K/\delta t$=change in relation to time $\delta \sigma/\delta L$=change of surface tension in relation to the length of the liquid sheet 1 on the measuring ring 2

$\delta \sigma/\delta D$=change of surface tension in relation to the elongation (tension) of the sheet 1 on the measuring ring 2

$\delta \sigma/\delta t$=change of surface tension in relation to time assume the value zero at the maximum force and, with further elongation or as more time elapses, change their sign. The change of sign of the differential quotients is utilised for switching two relays for optionally automatic change-over or switching off of the instrument without the sheet breaking.

With the automatic change-over and switching-off means according to FIGURE 4, the light beam of lamp 17 on a photoelement 18 is broken during the rise in the force up to the maximum by a diaphragm 21 carried along by a stylus holder 20 of the recording instrument 8 sliding on guide rod 19 in the direction of the arrow, until the stylus holder 20 reverses its direction of movement after reaching the maximum of the force. When light falls on the photoelement 18, either the coil of a relay 22 (the contacts of which are connected in parallel with the manual change-over switch for the motor of the spindle 12), or the coil of a relay 23 (the switching contacts of which are connected in series with switching-off device of this motor) is energised.

As the coil of the relay 22 is energised for changing over the spindle-driving motor, the measuring element 2 is again immersed into the liquid 10 to the depth of immersion set by the switch 15 or 16 and, after a measuring period adjusted by the time relay (not shown) is once again moved so far out of this liquid that the instrument again changes automatically at the maximum force.

As the coil of the relay 23 is energised for switching off the spindle-driving motor, the vessel with the liquid 10 to be tested remains in its position at the maximum of the force and the change as a function of time in the maximum force exerted on the measuring element 2 by the sheet 1 is automatically and continuously measured and recorded.

The arrangement for automatically changing over and switching-off the instrument also has a fixedly mounted screen 24 which prevents an undesired change-over or switching-off occurring when the measuring element 2 is immersed for the first time in the liquid 10a to be tested and on starting the fully automatic measuring procedure.

We claim:

1. An instrument for measuring and recording the boundary surface properties of liquids, which comprises: table means adapted to be moved up and down which supports means for holding the liquid to be measured; ring means suspended over said liquid adapted to be immersed in and withdrawn from said liquid; horizontal torsion means connected to two lever means, each being at substantially right angles to the other, the first of said lever means being substantially horizontally disposed and connected to said ring means; Wheatstone bridge circuit means connecting two induction coils; ferromagnetic disc means attached to the second lever means disposed between said induction coils; high-frequency AC inducement means attached to said Wheatstone bridge; amplifying means operatively associated with said Wheatstone bridge; recording means operatively associated with said amplifying means; wherein each of said lever means has a counterbalancing weight attached to one end thereof and wherein said torsion means is substantially rigidly anchored at both ends thereof, and means for stopping the movement of said table means upon maximum force on said ring means being measured.

2. The instrument as claimed in claim 1, including a photocell relay having a trailing diaphragm operatively associated with said recording means, which relay is activated by the movement of a recording stylus in said recording means; and further including drive means adapted to immerse said ring means in said liquid and to remove such therefrom, wherein said photocell relay is operatively connected to two additional relays adapted to shut off and change over said drive means.

References Cited

UNITED STATES PATENTS

| | | | |
|---|---|---|---|
| 2,124,968 | 7/1938 | Ahrndt et al. | |
| 2,635,463 | 4/1953 | Pouradier et al. | 73—64.4 |
| 2,756,587 | 7/1956 | Doble | 73—64.4 |
| 2,895,329 | 7/1959 | Hettche et al. | |
| 3,017,940 | 1/1962 | Baltac. | |
| 3,043,131 | 7/1962 | Heneage | 73—64.4 |

FOREIGN PATENTS 1,051,276  12/1966  Great Britain.

OTHER REFERENCES

Trurnit et al., "Automatic Recording Film Balance System," Rev. Sci. Inst., November 1959, p. 975–981.

S. CLEMENT SWISHER, *Acting Primary Examiner.*

J. W. ROSKOS, *Assistant Examiner.*

U.S. Cl. X.R.

73—53, 58